| United States Patent [19] | [11] 3,897,496 |
| Crounse et al. | [45] *July 29, 1975 |

[54] N,N-DIALKYL-N-C8–C22-ALKYL)-N-3-NITRO-4-METHOXYBENZYLAMMONIUM CHLORIDES

[75] Inventors: Nathan N. Crounse; Simon Bonta; Charles J. Ploss, all of Cincinnati, Ohio

[73] Assignee: Sterling Drug Inc., New York, N.Y.

[ * ] Notice: The portion of the term of this patent subsequent to Oct. 6, 1987, has been disclaimed.

[22] Filed: Aug. 24, 1973

[21] Appl. No.: 391,451

Related U.S. Application Data

[62] Division of Ser. No. 77,707, Oct. 2, 1970, abandoned.

[52] U.S. Cl............ 260/567.6 M; 424/329; 260/583
[51] Int. Cl............................................. C07c 87/00
[58] Field of Search ................. 260/567 M, 567.6 N

[56] References Cited
UNITED STATES PATENTS

| 2,951,787 | 9/1960 | Cicero et al. | 260/567.6 |
| 3,360,563 | 12/1967 | Bonta | 260/567.6 |
| 3,446,844 | 5/1969 | Carosino | 260/567.6 |
| 3,532,750 | 10/1970 | Crounse et al. | 260/567.6 |

OTHER PUBLICATIONS

Gulati et al., Indian J. Chem., 2(3), pp. 114–118, (1964).

*Primary Examiner*—Bernard Helfin
*Assistant Examiner*—James H. Reamer
*Attorney, Agent, or Firm*—Lynn T. Fletcher; B. Woodrow Wyatt

[57] ABSTRACT

Germicidal, fungicidal, and algicidal N-(4-methoxy-3-nitrobenzyl)quaternary ammonium compounds are obtained by reacting tertiary amines bearing at least one high molecular weight alkyl group with 4-methoxy-3-nitrobenzyl chloride.

3 Claims, No Drawings

N,N-DIALKYL-N-C8-C22-ALKYL)-N-3-NITRO-4-METHOXYBENZYLAMMONIUM CHLORIDES

The present application is a division of our co-pending application Ser. No. 77,707, filed Oct. 2, 1970 now abandoned.

This invention relates to novel germicidal, fungicidal and algicidal quaternary ammonium compounds and to methods for their preparation.

In its composition of matter aspect, the invention sought to be patented resides in the novel quaternary ammonium compounds having the structural formula

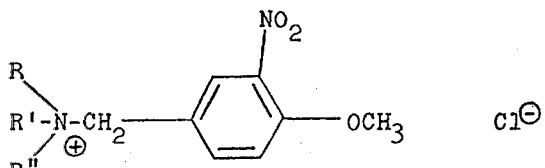

Formula I wherein R is alkyl having 1 to 22 carbon atoms; R' is lower-alkyl; and R'' is higher-alkyl having 8 to 22 carbon atoms.

When R is alkyl having 1 to 22 carbon atoms, there are included, for example, methyl, ethyl, n-butyl, n-heptyl, isooctyl, decyl, tridecyl, octadecyl, eicosyl and docosyl.

As used in each of the preceding definitions and throughout this disclosure the term "lower" means groups having at most seven carbon atoms. In contrast, the term "higher" means groups having from eight to twenty-two carbon atoms. Thus for purpose of illustration and without limitation thereto, lower-alkyl includes, for example; methyl, ethyl, n-propyl, isopropyl, n-butyl, n-hexyl, and n-heptyl; and higher-alkyl includes, for example, octyl, nonyl, tridecyl, hexadecyl, eicosyl, and docosyl.

In its process aspect, the invention sought to be patented resides in the process which comrises reacting a compound of the formula

Formula II wherein R, R' and R'' have the same respective meanings given hereinabove, with a stoichiometric amount of 4-methoxy-3-nitrobenzyl chloride. The reaction is preferably carried out at a temperature between 50° and 110° C. in a suitable medium, for example a polar solvent or a mixture of polar solvents. Quaternization is usually complete in from 1 to 48 hours, depending upon the nature of the reactants, the nature of the reaction medium, and the reaction temperature. It is convenient to employ a reaction medium which boils within the specified range in order that the reaction temperature is maintained by merely refluxing the medium. Convenient media for carrying out the process according to this aspect of the invention include water; the lower-alcohols, for example, methanol, ethanol, isopropyl alcohol, and the like; the lower-alkylene glycols, for example, ethylene glycol and propylene glycol; acetonitrile; the lower ketones, for example, acetone and ethyl methyl ketone; and dimethylformamide. We generally prefer to use aqueous acetone as the reaction medium because the products are readily recovered from this medium and it is inexpensive.

Quaternary ammonium salts heretofore used as germicidal and fungicidal agents have suffered from inherent drawbacks. One of these drawbacks is that such compounds are usually waxy solids or viscous liquids which tend to readily absorb moisture from the atmosphere. This renders the compounds difficult to handle and makes it virtually impossible to supply the consumer with a form of the compound that can conveniently be dispensed in measured quantity. Another drawback found in many of the quaternary ammonium salts heretofore used as germicidal, fungicidal and algicidal agents is that they loose their antimicrobial effectiveness when used in the presence of hard water.

In a more particular aspect of the present invention, a preferred group of our biocidal N-(4-methoxy-3-nitrobenzyl) quaternary ammonium compounds are represented by the formula

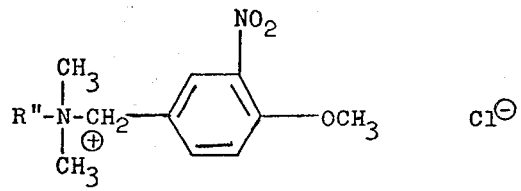

Formula III wherein R'' has the same meanings given hereinbefore. These compounds of Formula III are devoid of the above-mentioned drawbacks. For example, N,N-dimethyl-N-(4-methoxy-3-nitrobenzyl)-N-myristylammonium chloride is a free-flowing, white powder which does not tend to absorb moisture from the air. This property together with its relatively high melting point (72.0°–75.5° C.) make the compound particularly adaptable to incorporation into tablets by conventional pressing techniques. Furthermore, N,N-dimethyl-N-(4-methoxy-3-nitrobenzyl)-N-myristylammonium chloride was found to retain its antimicrobial effectiveness in water containing more than 600 parts per million of dissolved calcium and magnesium salts.

The organic tertiary amines used as starting materials for the preparation of the compounds of the present invention are either generally known in the art or are prepared by conventional alkylation processes, for example, the alkylation of the appropriate primary or secondary amine.

Exemplary tertiary amines useable in and within the purview of this invention which are either known in the art or can be made by such processes are:

N,N-Diethyldodecylamine
N,N-Dimethyltetradecylamine
N-Methyldioctadecylamine
N,N-Dimethylnonadecylamine
N,N-Dimethyldocosylamine
N-Hexyl-N-undecyltetradecylamine
N-Nonyl-N-pentyltetradecylamine
N,N-Diheptyloctylamine
N-Butyl-N-isopropyldecylamine
N-Propyldieicosylamine N-Methylditetradecylamine
N-Isopropyl-N-pentylnonylamine
N-Methyldipentadecylamine
N,N-Dibutyltridecylamine
N-Methyl-N-hexadecylheneicosylamine
N,N-Dimethylheptadecylamine
N,N-Dihexylheneicosylamine
N-Ethyl-N-octylundecylamine The 4-methoxy-3-nitrobenzyl chloride required for the preparation of the compounds of this invention and methods for its preparation are well known in the art.

The structure of the compounds of the invention is established by the mode of synthesis, by chemical analysis and by appropriate spectral properties.

The following examples further illustrate specific embodiments of the invention without the latter being limited thereto.

EXAMPLE 1

A stirred mixture of 60.3 g. (0.25 mole) of freshlydistilled N,N-dimethylmyristylamine and 4.0 g. of water was heated to 80° C. Heating was then decreased to maintain the mixture at a temperature between 65°and 70° C. while during a period of one hour 46.8 g. (0.23 mole) of 4-methoxy-3-nitrobenzyl chloride was added in small portions. When approximately one-half of the 4-methoxy-3-nitrobenzyl chloride had been introduced, 20.0 ml. of acetone was added to the mixture. At the end of the addition, 75.0 ml. of acetone was added and the mixture was heated at reflux for fifteen minutes and then the resultant solution was allowed to cool slowly. When the temperature dropped to approximately 30° C., some crystalline material began to separate. An additional 200 ml. of acetone was added and the mixture heated to reflux to effect complete solution. The solution was then chilled. A crystalline solid separated and was collected by filtration. The solid was washed with three 50.0 ml. portions of acetone and airdried to obtain 85.5 g. of a pale yellow powder. This product was recrystallized from 250 ml. of boiling acetone to obtain 72.4 g. of N,N-dimethyl-N-(4-methoxy-3-nitrobenzyl)-N-myristylammonium chloride as a colorless, free-flowing solid, melting at 72°–75.5°C.

Phenol coefficients obtained for this product by standard biological testing procedure are:

| Organism | Phenol Coefficient at 20° C. |
|---|---|
| Staph. Aureus | 785 |
| Sal. typhosa | 722 |

Moreover, this product was effective as a germicidal agent in hard water as determined by the Chambers test method described in Official Methods of Analysis of the Association of Official Agricultural Chemists, Tenth Edition, page 87–89, Association of Official Agricultural Chemists, Washington, D.C., C., 1965. For example, a solution of 200 parts per million of N,N-dimethyl-N-(4-methoxy-3-nitrobenzyl)-N-myristylammonium chloride in water containing 600 parts per million of dissolved calcium and magnesium salts at 25° C., was found to kill in 30 seconds 99.999 percent or more of the viable cells of *Escherichia coli* at a concentration of $1 \times 10^8$ cells per milliliter.

The representative results shown below were obtained when N,N-dimethyl-N-(4-methoxy-3-nitrobenzyl)-N-myristylammonium chloride was tested in vitro by standard serial dilution procedures for bacteriostatic (Bs), bactericidal (Bc), fungistatic (Fs), and fungicidal (Fc) properties; these results are expressed as minimum concentration of the test compound, in parts per million, required for no growth of the test organism. For example, in antibacterial tests, using *Staphylococcus aureus* 209, *Salmonella typhosa* Hopkins, *Clostridium welchii* M, and *Pseudomonas aeruginosa* 211, the results obtained were as follows:

| Staph. aureus | | Sal. typhosa | | Cl. welchii | | Ps. aerug. | |
|---|---|---|---|---|---|---|---|
| Bs | Bc | Bs | Bc | Bs | Bc | Bs | Bc |
| 1 | 7.5 | 10 | 25 | 2.5 | 2.5 | >100 | — |

In antifungal tests, using *Trichophyton mentagrophytes*, *Aspergillus niger*, and *Monilia albicans* as the test organisms, the following results were obtained:

| T. mentag. | | As. niger | | Mon. alb. | |
|---|---|---|---|---|---|
| Fs | Fc | Fs | Fc | Fs | Fc |
| 10 | 10 | 10 | 10 | 10 | 10 |

EXAMPLE 2

When an equivalent amount of N,N-diethyldodecylamine is substituted for the N,N-dimethylmyristylamine in the procedure described in Example 1 above, there is obtained as the product N,N-diethyl-N-(4-methoxy-3-nitrobenzyl)-N-dodecylamonium chloride.

EXAMPLE 3

When an equivalent amount of N-methyldioctadecylamine is substituted for the N,N-dimethylmyristylamine in the procedure described in Example 1 above, there is obtained as the product N-methyl-N-(4-methoxy-3-nitrobenzyl)-N,N-dioctadecylammonium chloride.

EXAMPLE 4

Following the procedure described in Example 1 above but using an equivalent amount of N,N-dimethylnonadecylamine in place of N,N-dimethylmyristylamine, there is obtained as the product N,N-dimethyl-N-(4-methoxy-3-nitrobenzyl)-N-nonadecylammonium chloride.

EXAMPLE 5

When an equivalent amount of N,N-dimethyldocosylamine is substituted for the N,N-dimethylmyristylamine in the procedure described in Example 1 above, there is obtained as the product N,N-dimethyl-N-(4-methoxy-3-nitrobenzyl)-N-docosylammonium chloride.

EXAMPLE 6

Following the procedure described in Example 1 above but using an equivalent amount of N-hexyl-N-undecyltetradecylamine in place of N,N-dimethylmyristylamine, there is obtained as the product N-hexyl-N-undecyl-N-(4-methoxy-3-nitrobenzyl)-N-tetradecylammonium chloride.

POLYAMIDE-IMIDES

This is a division of Ser. No. 182,526 filed Sept. 21, 1971, now U.S. Pat. No. 3,817,921, which is in turn a continuation-in-part of Ser. No. 50,968 filed June 29, 1970, now abandoned.

BACKGROUND OF THE INVENTION

This invention relates to novel aromatic diamines and more particularly to aromatic polyamide-imides synthesized therefrom by condensation polymerization with trimellitic acid anhydride or trimellitic anhydride acid chloride or trimellitic acid.

The need for high polymeric coating materials which exhibit good high temperature stability has been partially satisfied by the synthesis of aromatic polyimides by the condensation polymerization of arylene diamines with aromatic dianhydrides. For example, polyimides prepared in one instance from phenylenediamine and pyromellitic dianhydride having repeating units are presented by the formula

have been recommended for use as wire coatings. While such compounds fulfill the demands for high temperature stability, they were deficient in other properties such as adhesion, elongation, ease of drying, solubility in organic solvents, and tractability or flow at application temperature. Some of these difficulties were overcome by either changing the imide linkages to amide linkages or to amide-imide linkages or by replacing the arylene moiety of the diamine with polynuclear entities such as:

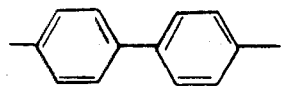 or 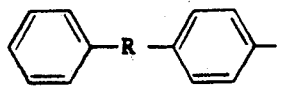

where R is alkylidene $-O-$, $-S-$, $$-\overset{O}{\underset{\|}{C}}-$$

and the like.

As so often happens in custom making high polymers to improve a particular property, the desired end is achieved only by the loss of one or more of the other properties. Thus for example, the substitution of amide linkages for imide linkages in polymers made from simple aromatic diamines improves tractability but renders the polymer less thermally and oxidatively stable, (J. I. Jones et al., Chemistry and Industry, 1686, Sept. 22, 1962). The polymers of this invention overcome the difficulties associated with polyimides and at the same time are useful in a wider range of applications than can be considered for any previously available high temperature polymer.

SUMMARY OF THE INVENTION

It has now been found that novel high temperature resistant, normally solid, polyamide-imides which have excellent physical and chemical properties can be synthesized having repeating units represented by the formula:

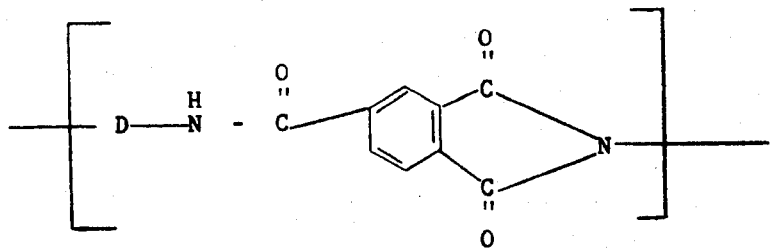

wherein D is a residue remaining after removal of both amine groups from at least one diamine having the formula:

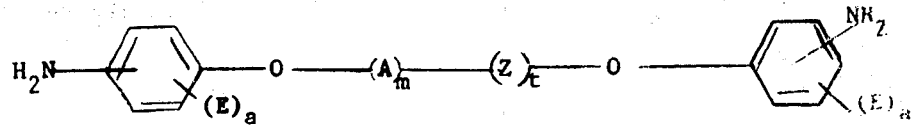

wherein A is a divalent radical selected from the group consisting of:

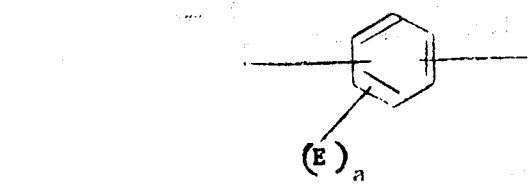

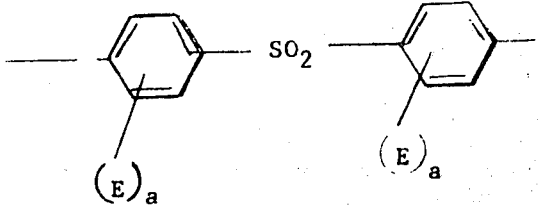

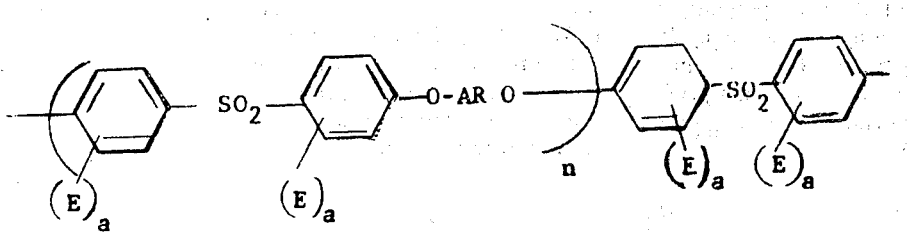

Z is a divalent radical selected from the group consisting of

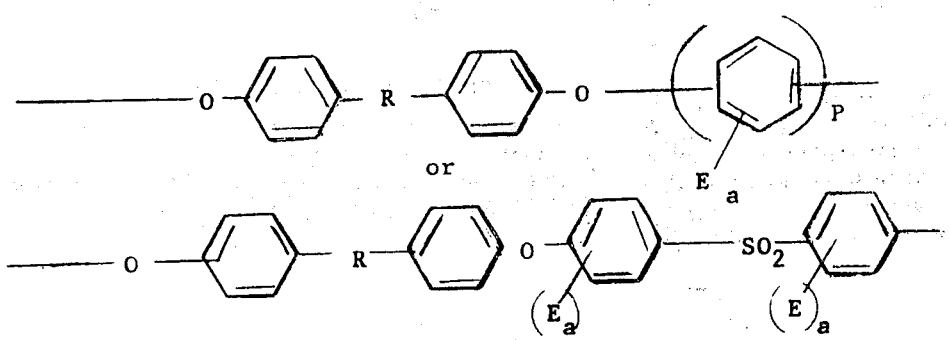

and wherein:

$m$ and $p$ are integers having values of 0 to 4

$t$ is an integer having values of 0 to 5 with the proviso that $m$ and $t$ cannot both be 0 at the same time E is a halogen including F, Cl, or Br each $a$ is an integer having values of 0 to 4

Ar is a divalent radical selected from the group consisting of

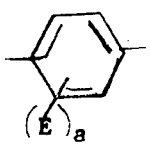 and 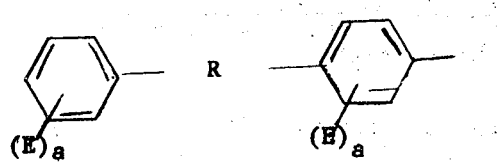

R is an alkylidene radical having 1 to 10 carbon atoms therein, and $n$ is a rational number having values of 0 to about 25.

DESCRIPTION OF THE INVENTION

These novel polyamide-imides can be prepared by first condensing a trimellitoyl halide such as trimellitic anhydride acid chloride and one of the diamines described above in a polar solvent such as dimethylacetamide to form a low molecular weight polyamic acid which upon treatment with an equivalent amount of an HCl scavenger, such as, anhydrous triethylamine rapidly increases in molecular weight to that of a high polymer. This reaction is illustrated below with trimellitoyl chloride and a sulfone ether diamine. The polyamic acid is then dehydrated in situ with a chemical dehydrating agent such as acetic anhydride to the polyamide-imide as shown below: